Feb. 25, 1936.  J. C. McCUNE  2,032,143
TRIPLE VALVE DEVICE
Filed May 29, 1931  2 Sheets-Sheet 2
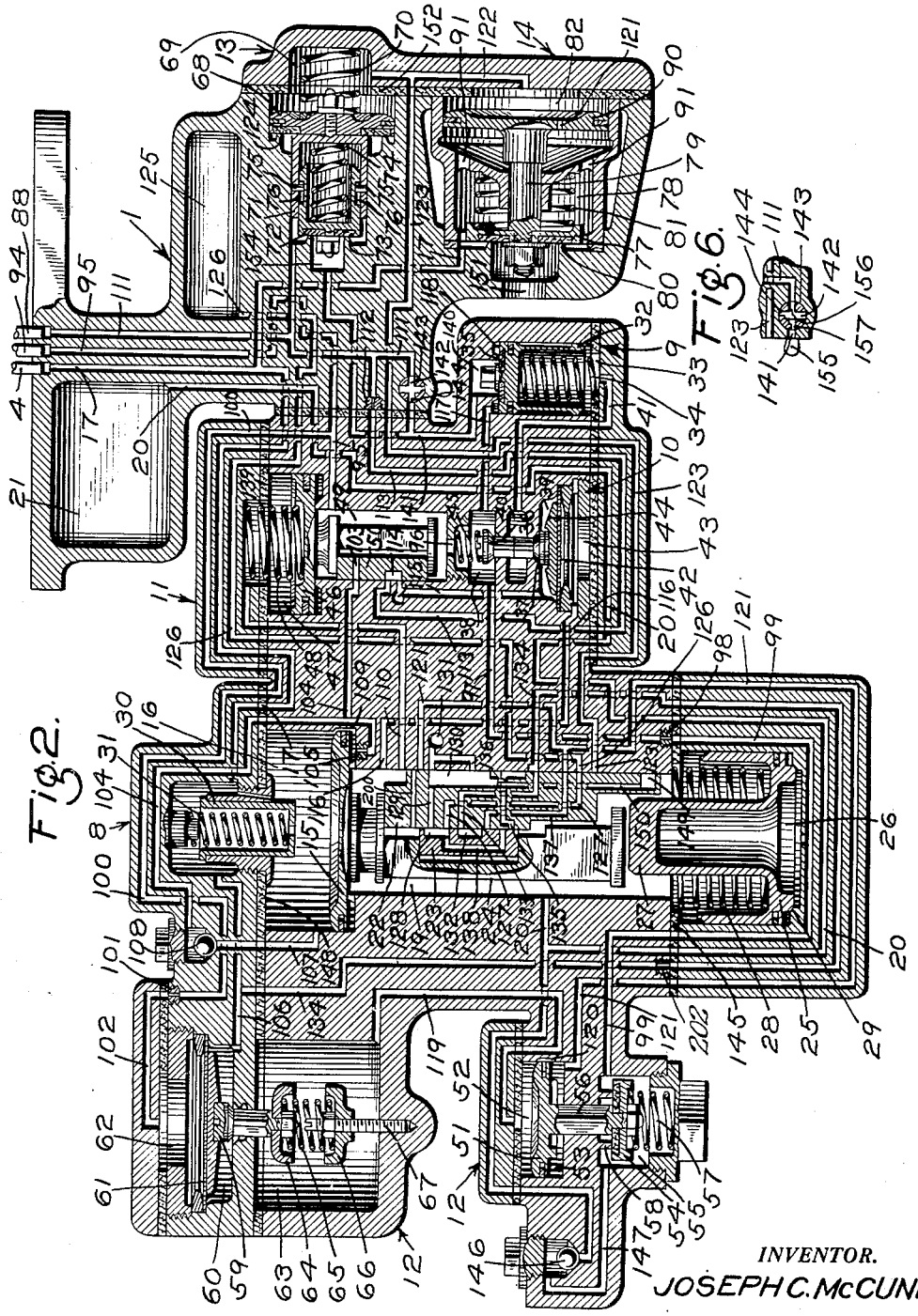
INVENTOR.
JOSEPH C. McCUNE
By Wm. M. Cady
ATTORNEY.

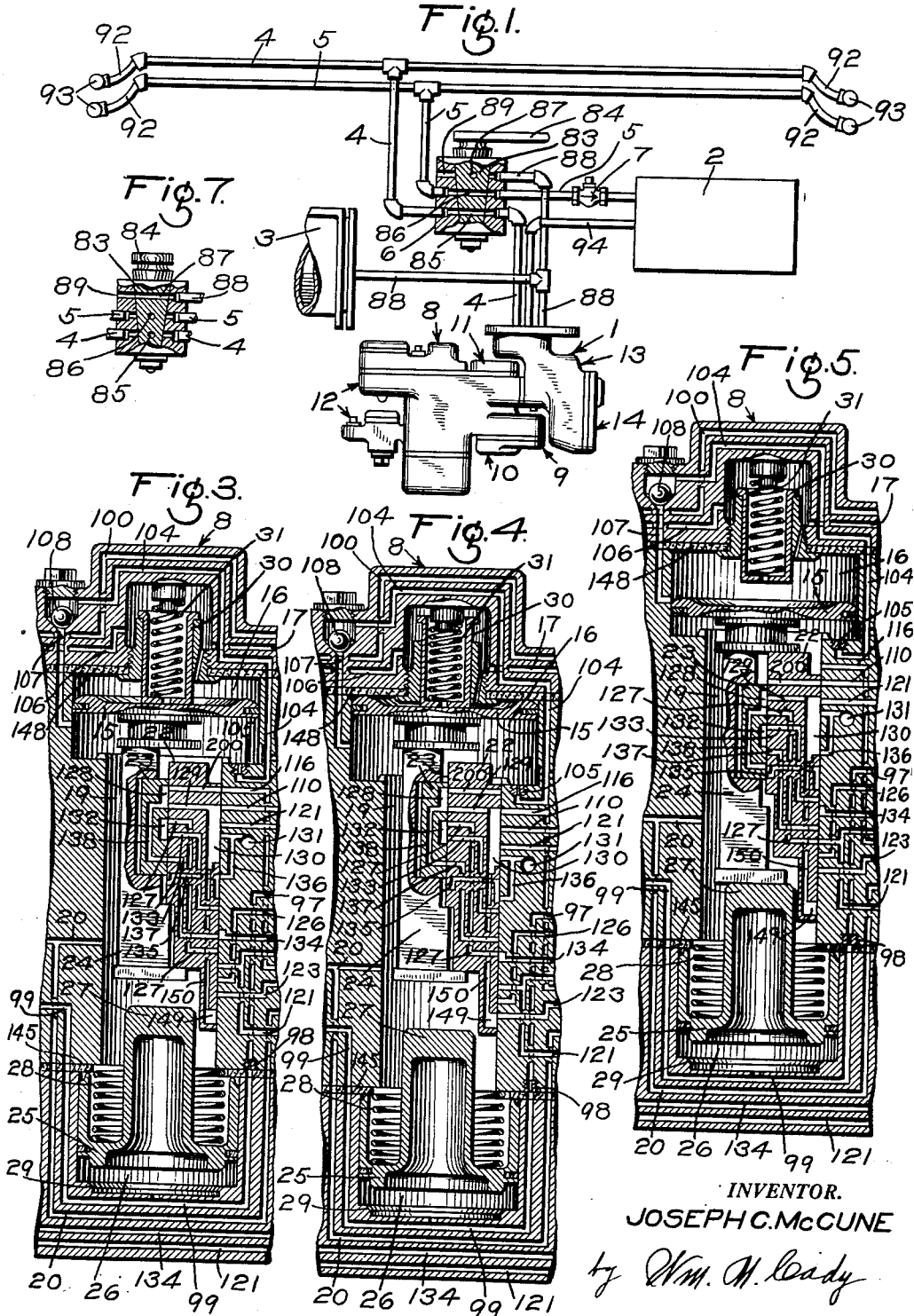

Patented Feb. 25, 1936

2,032,143

UNITED STATES PATENT OFFICE

2,032,143

TRIPLE VALVE DEVICE

Joseph C. McCune, Edgewood, Pa., assignor to The Westinghouse Air Brake Company, Wilmerding, Pa., a corporation of Pennsylvania Application May 29, 1931, Serial No. 540,860

38 Claims. (Cl. 303—30)

This invention relates to fluid pressure brakes, and more particularly to a brake equipment of the type employing a brake pipe and a fluid pressure supply pipe independent of the brake pipe.

It has heretofore been proposed to provide a brake equipment of the above type and one object of my invention is to provide an improved brake controlling valve device for such an equipment.

Another object of my invention is to provide an improved brake controlling valve device having an equalizing valve device which functions as a pilot valve device in controlling the application and the release of the brakes.

Another object of my invention is to provide an improved brake controlling valve device having an equalizing valve device for controlling the application and release of brakes, and release ensuring means for effecting positive movement of said equalizing valve device to the release position when the brake pipe is charged to substantially the pressure normally carried.

Another object of my invention is to provide an improved brake controlling valve device for controlling the application and release of brakes and movable to release position upon a small increase in brake pipe pressure after an emergency application of the brakes.

Another object of my invention is to provide an improved brake controlling valve device having a choke for controlling the rate of supply of fluid under pressure to the brake cylinder in a serive application of the brakes and an emergency valve for opening a by-pass around said choke for increasing the rate of supply of fluid under pressure to the brake cylinder in an emergency application of the brakes.

Another object of my invention is to provide an improved brake controlling valve device having a quick service position for venting fluid under pressure from the brake pipe to a quick service chamber, and a service position for venting fluid under pressure from the brake pipe directly to the atmosphere, and for at the same time controlling an application of the brakes.

Another object of my invention is to provide an improved brake controlling valve device having an equalizing valve device for controlling the supply of fluid under pressure to the brake cylinder, and means operated independently of said equalizing valve device for varying the rate at which fluid under pressure is supplied to said brake cylinder.

Other objects and advantages will appear in the following more detailed description of my invention.

In the accompanying drawings: Fig. 1 is a diagrammatic view of a fluid pressure brake equipment embodying my improvements; Fig. 2 is a diagrammatic sectional view of the brake controlling valve mechanism shown in Fig. 1 and with the parts in their brakes released position; Fig. 3 is a diagrammatic view of the equalizing portion of the brake controlling valve mechanism shown in Fig. 2 with the parts shown in service application position; Fig. 4 is a diagrammatic view of the equalizing portion of the brake controlling valve mechanism shown in Fig. 2 with the various parts in emergency application position; Fig. 5 is a diagrammatic view of the equalizing portion of the brake controlling valve mechanism shown in Fig. 2 with the various parts shown in graduated release position; Fig. 6 is a sectional view of a fragment of the brake controlling valve mechanism shown in Fig. 2, showing the application control plug valve in a different position; and Fig. 7 is a sectional view of the cutout valve shown in Fig. 1 with the plug valve in a different position.

As shown in Fig. 1 of the drawings, the improved fluid pressure brake equipment comprises a brake controlling valve mechanism 1, a fluid pressure supply reservoir 2, a brake cylinder 3, a brake pipe 4, a fluid pressure supply pipe 5, a cutout valve device 6 and a check valve device 7.

The brake controlling valve mechanism comprises an equalizing valve device 8, a service application valve device 9, a service application valve control valve 10, a release valve device 11, a release ensuring valve device 12, an emergency application valve device 13 and a vent valve device 14.

The equalizing valve device 8 comprises a piston 15 having at one side a chamber 16 communicating through passage 17 with the brake pipe 4, and having at the other side a valve chamber 19 communicating through a passage 20 with a pressure or control chamber 21. The piston 15 is provided with a stem 24 extending through chamber 19, said stem and piston being adapted to move a main slide valve 22 and an auxiliary slide valve 23 to various positions in accordance with variations in pressure on the opposite sides of said piston.

A graduated release stop device is provided for limiting the movement of the equalizing piston 15 and slide valves 22 and 23 in graduating the release of brakes and comprises a valve piston 25 having a chamber 26 at one side and open at the other side to the valve chamber 19. Said valve piston is provided with a stop 27 preferably extending into the valve chamber 19 and adapted under certain conditions to be engaged by the piston stem 24, but the valve piston is normally maintained in the position shown in the drawings by a spring 28. In this normal position, the stop 27 is out of engagement with piston stem 24, and said valve piston engages a seat 29.

Extending into the equalizing piston chamber 16 is a movable stop 30 subject to the pressure of a spring 31.

The service application valve device 9 comprises a valve piston 32 having at one side a chamber 33 containing a spring 34 for urging said valve piston into engagement with a seat rib 35.

The service application control valve device 10 comprises two oppositely disposed check valves 36 and 37. The check valve 36 is contained in a chamber 38 and the check valve 37 is contained in a chamber 39. Each of said check valves has a fluted stem extending into and engaging one another in a chamber 40 which is open through passage 41 to the service application valve piston chamber 33. For moving the check valves in one direction, a flexible diaphragm 42 is provided. The diaphragm 42 has at one side a chamber 43 and is open at the other side to chamber 39, and a follower 44 is interposed between said diaphragm and the check valve 37. A spring 45 in the check valve chamber 38 is provided for urging the valves 36 and 37 in the opposite direction so as to seat valve 36 and unseat valve 37.

The release valve device 11 comprises a piston 46 having at one side a chamber 47 containing a spring 48 acting on said piston and having at the opposite side a chamber 49 containing a slide valve 50 adapted to be operated by said piston.

The release ensuring valve device 12 comprises a piston 51 having at one side a chamber 52 and at the opposite side a chamber 53, and a poppet valve 54 contained in a chamber 55 and adapted to be unseated by said piston. The piston 51 and valve 54 are connected together by a fluted stem 56, and a spring 57 is provided in chamber 55 for urging the valve 54 into engagement with a seat rib 58.

For controlling the operation of the piston 51, a valve 59 is provided in a chamber 60 and is adapted to be pressed into engagement with its seat by the deflection of a flexible diaphragm 61 having one side open to chamber 60 and the opposite side open to a chamber 62. The valve 59 is provided with a fluted stem extending into a chamber 63 and carrying a spring seat 64 acted upon by a spring 65. The other end of spring 65 is supported in a spring seat 66 adjustably mounted on a screw-threaded stud 67, one end of which is secured to the casing. It will therefore be evident that spring 65 may be adjusted by varying the position of seat 66 on stud 67, so that regardless of possible variations in manufacture, each and every release ensuring valve device 12 may be adjusted to the same spring pressure, to thereby provide uniform operation throughout the train.

The emergency application valve device 13 comprises a piston 68 having at one side a chamber 69 containing a spring 70 acting on said piston. Secured to the opposite side of said piston is a hollow sleeve 71 telescopically containing a valve piston 72, which is normally pressed into engagement with a seat rib 73 by a spring 74. The sleeve 71 is provided with a plurality of stop pins 75 adapted to slide in corresponding slots 76 in the valve piston 72 for limiting the relative outward movement of valve piston 72 to sleeve 71.

The vent valve device 14 comprises a vent valve 77 contained in a chamber 78 and a piston 80 connected to said vent valve by a stem 79 for operating said vent valve which is normally pressed into engagement with a seat rib 80 by a spring 81. The piston 90 has at one side a chamber 82, and the other side of said piston is open through a plurality of passages 91 to the vent valve chamber 78.

The cut-out valve device 6 comprises a body containing a plug valve 83 movable from one to the other of the two positions shown in Figs. 1 and 7 by a handle 84. The plug valve is provided with three ports, a port 85 for establishing communication from the brake pipe 4 to the brake controlling valve device 1, a port 86 for establishing communication from the fluid pressure supply pipe 5 to the supply reservoir 2 by way of the check valve device 7, and a port 87 arranged at right angles to ports 85 and 86 and adapted in the cut-out position shown in Fig. 7, to connect the brake cylinder pipe 88 to an atmospheric passage 89.

The brake pipe 4 and fluid pressure supply pipe 5 are connected between the cars of a train by means of the usual flexible hose 92 and hose couplings 93. The brake pipe 4 is supplied with fluid under pressure by the operation of a brake valve device (not shown) in the usual well known manner, and the fluid pressure supply pipe 5 is connected directly to a source of fluid under pressure such as a main reservoir (not shown) or a fluid compressor (not shown).

In operation, fluid under pressure from the fluid pressure supply pipe 5 flows through the check valve device 7 to the fluid pressure supply reservoir 2, thereby charging said reservoir. From the supply reservoir 2 fluid under pressure flows through pipe 94 to the brake controlling valve device 1 and from thence through passage 95 to the release valve chamber 49. From chamber 49 fluid under pressure flows through a passage 96 to the service application control valve chamber 38 and from thence through passage 97, a choke plug 98 and passage 99 to chamber 26 at the lower side of the graduated release valve piston 25 and also from passage 99 to the poppet valve chamber 55 of the release ensuring valve device 12.

Fluid under pressure also flows from the supply reservoir passage 95 through passage 100, choke plug 101 and passage 102 to diaphragm chamber 62 of the release ensuring valve device 12, and from the release valve chamber 49 through a port 103 in slide valve 50, passage 104 and a choke plug 105 to the equalizing valve chamber 19.

At the same time as fluid under pressure is thus being supplied to the brake controlling valve device 1 from the supply reservoir 2, fluid under pressure also flows from the brake pipe 4 through passage 17 in the brake controlling valve device 1 to the vent valve chamber 78 and to the equalizing piston chamber 16 and from said chamber through passage 106 to diaphragm chamber 60 of the release ensuring valve device 12.

With the equalizing piston 15 in the release position, as shown in Fig. 2 of the drawings, fluid under pressure flows from chamber 16 through passage 107, past a ball check valve 108 to passage 104 through which fluid under pressure is also being supplied from the supply reservoir 2.

Fluid under pressure thus being supplied from the supply reservoir 2 and brake pipe 4 to passage 104 and from thence through choke plug 105 to the equalizing valve chamber 19, flows from said chamber through passage 20 to the control chamber 21, thereby charging said chambers to brake pipe pressure and supply reservoir pressure; which normally are equal.

Fluid under pressure also flows from the equalizing piston chamber 16 through a feed groove 109 around the piston 15 to valve chamber 19. This flow through the feed groove 109 is not essential to the operation of the brake controlling valve device but is provided to ensure equalization of pressures on the equalizing piston 15 when said piston is in release position, as shown in Fig. 2 of the drawings.

With the equalizing valve device in the release position, fluid under pressure flows from the valve chamber 19 through passage 110 to the release valve piston chamber 47. The fluid pressures thus equalize on the opposite sides of the piston 46 and said piston and the slide valve 50 are maintained in the release position shown in the drawings by the pressure of spring 48. In the release position of slide valve 50, the brake cylinder 3 is open to the atmosphere through pipe 88, passage 111, choke plug 112, passage 113, cavity 114 in said slide valve and an atmospheric passage 115.

Chamber 39 at the upper side of diaphragm 42 of the service application control valve device 10 is at all times open to the atmosphere through the atmospheric passage 115, and in the release position of the equalizing slide valve 22, fluid under pressure is supplied through passage 116 to chamber 43 at the lower side of said diaphragm. The pressure of fluid in chamber 43 holds valve 37 seated and valve 36 unseated against the opposing pressure of spring 45. With valve 36 unseated, fluid at supply reservoir pressure flows from chamber 38 to chamber 40 and from thence through passage 41 to the spring side of the valve piston 32. The valve piston 32 is thus held seated against the seat rib 35 by the pressure of fluid in chamber 33 and the pressure of spring 34 against the opposing pressure of fluid supplied from chamber 38 through passage 117 to cavity 118 outside of said seat rib.

With the equalizing valve chamber 19 charged to brake pipe pressure and chamber 26 at the opposite side of the graduated release piston 25 charged with fluid from the supply reservoir, which pressure equals brake pipe pressure, said piston is maintained in its lower position by the pressure of spring 28. The diaphragm 61 of the release ensuring valve device is also subject to the opposing pressures of the brake pipe and supply reservoir and when the equipment is completely charged and said pressures are equal, the spring 65 holds the valve 59 unseated. Brake pipe pressure is thereby permitted to flow past the valve 59 to chamber 63 and from thence through passage 119 to piston chamber 52 and from thence through the feed groove 120 to chamber 53. Passage 121 leading from the piston chamber 53 is normally lapped by the equalizing slide valve 22, so that the pressures equalize on the opposite sides of the piston 51 and the spring 57 holds the poppet valve 54 seated.

Fluid under pressure supplied from the brake pipe to the vent valve chamber 78 flows through port 121 in the vent valve piston 90 to chamber 82 and from thence through passage 122 to the emergency application valve piston chamber 69. Passage 122 is connected by way of passage 123 to the seat of the equalizing slide valve 22 and is normally lapped by said slide valve, so that the pressures in chambers 82 and 69 equalize with brake pipe pressure. This permits spring 81 to hold the vent valve 77 seated against the seat rib 80, and spring 70 to hold the piston 68 seated against the seat rib 124. With the piston 68 in this position, the valve piston 72 is pressed into engagement with seat rib 73 by the pressure of spring 74.

When the equalizing slide valves 22 and 23 are in the full release position shown in Fig. 2, a quick service chamber 125 is connected with the atmosphere through passage 126, port 127 in the main slide valve 22, cavity 128 in the auxiliary slide valve 23, port 129 and cavity 130 in the main slide valve 22 and an atmospheric passage 131.

In order to effect a service application of the brakes, the pressure of fluid in the brake pipe 4 is gradually reduced in the usual manner and a corresponding reduction occurs in the connected equalizing piston chamber 16.

When the brake pipe pressure in piston chamber 16 becomes thus reduced a predetermined degree below the control chamber pressure in chamber 19, the equalizing piston 15 is operated to move the auxiliary slide valve 23 upwardly from release position to quick service position, in which position the piston stem 24 engages the lower end of the main slide valve 22 and communication through the feed groove 109 is closed.

The movement of the equalizing piston 15 and auxiliary slide valve 23 temporarily ceases in quick service position for the reason that insufficient pressure differential is at this time acting on said piston for moving the main slide valve which is provided with a cavity 130 for subjecting a predetermined area of its seating face to atmospheric pressure so as to increase its resistance to movement to a predetermined degree for reasons which will be hereinafter more fully explained.

In quick service position of the auxiliary slide valve 23, a cavity 132 connects ports 133 and 127 in the main slide valve 22. Port 133 registers with passage 134 which is connected through passage 106 to the brake pipe passage 17, so that fluid under pressure is permitted to flow from the brake pipe 4 through passages 106 and 134, port 133, cavity 132 in the auxiliary slide valve 23 and port 127 to passage 126 leading to the quick service chamber 125, thereby effecting a local quick service reduction in brake pipe pressure for rapidly transmitting the brake pipe reduction serially from car to car through the train.

When a predetermined reduction in brake pipe pressure, of for instance four pounds, is obtained by the combined operation of the usual brake valve device (not shown) and the quick service action, the pressure of fluid in chamber 19 shifts the equalizing piston 15 and slide valves 22 and 23 to service position, shown in Fig. 3 of the drawings, in which position the piston 15 engages the movable stop 30.

In service position, passage 126 is lapped so that the quick service volume 125 is isolated, but further quick service action is effected by venting fluid under pressure directly from the brake pipe to the atmosphere through passages 17 and 134, port 137 in the main slide valve 22, port 138 and cavity 128 in the auxiliary slide valve 23, port 129 and cavity 130 in the main slide valve 22 and atmospheric passage 131. This further quick service venting from the brake pipe hastens the rate of brake pipe reduction and it further has the effect of smothering the turbulence created in the brake pipe by the initial quick service venting to the quick service volume 125, so as to obtain a more uniform brake pipe reduction. This final quick service venting of fluid under pressure from the brake pipe to the atmosphere is also desirable from another standpoint in that it ensures local quick service venting of fluid under pressure from the brake pipe, if for any reason the piston 15 and slide valves 22 and 23 fail to stop in quick service position, but instead move directly to service position upon a reduction in brake pipe pressure. A further reason for this final quick service venting of fluid under pressure directly from the brake pipe to the atmosphere is that it operates to effect a quick service action upon successive reductions in brake pipe pressure in graduating an application of the brakes, as will hereinafter be more fully explained.

In service position of the slide valves 22 and 23, a port 135 in the main slide valve 22 is uncovered by the auxiliary slide valve 23 and registers with passage 136 leading to the atmospheric passage 131. This permits fluid under pressure to flow from chamber 19 and the connected control chamber 21, through passage 20 to the atmosphere at substantially the same rate as the brake pipe pressure is being reduced.

In service position of the equalizing valve device, fluid under pressure is vented from the release piston chamber 47 to the atmosphere through passage 110, port 138 in the main slide valve 22, cavity 128 in the auxiliary slide valve 23, port 129 and cavity 130 in the main slide valve 22 and atmospheric passage 131. This permits the supply reservoir pressure in the release valve chamber 49 to shift the piston 46 and slide valve 50 upwardly against the pressure of spring 48 and until the piston engages a gasket 139. In this position passage 104 is lapped so as to prevent further flow of fluid from chamber 49 to the equalizing valve chamber 19, and passage 113, which is connected by a passage 111 to the brake cylinder pipe 88, is also lapped.

Fluid under pressure is also vented from diaphragm chamber 43 of the service application control valve device through passage 116, port 200 in the main slide valve 22, cavity 128 in the auxiliary slide valve 23, passage 129 and cavity 130 in the main slide valve 22 and atmospheric passage 131. This permits the pressure of spring 45 to seat valve 36 so as to cut off the supply of fluid under pressure to the service application valve chamber 33. The seating of valve 36 unseats valve 37 which vents fluid under pressure from the service application valve chamber 33 through passage 41, chamber 40, chamber 39 and atmospheric passage 115.

With the service application valve chamber 33 thus connected to the atmosphere, supply reservoir pressure acting in cavity 118 on the opposite side of the valve piston 32, moves said valve piston away from the seat rib 35 against the pressure of the spring 34. This permits fluid under pressure to flow from the supply reservoir 2 to the brake cylinder 3 by way of pipe 94, passage 95, valve chambers 49 and 38, passage 117, past the valve piston 32 to chamber 140 and from thence through passage 141, port 142 in an application control plug valve 143, passage 111 and brake cylinder pipe 88, the rate of flow being governed by the restriction or choke 144 in port 142. Fluid under pressure thus supplied to the brake cylinder 3 effects an application of the brakes in the usual manner.

Fluid under pressure continues to be supplied to the brake cylinder up to equalization with the pressure of fluid supplied to the supply reservoir 2, if the equalizing valve device 8 is maintained in the service position by a continued reduction in brake pipe pressure.

If, however, it is desired to limit the degree of brake application, then as soon as the desired degree of brake pipe reduction is effected, the usual brake valve device (not shown) is operated so as to prevent any further reduction in brake pipe pressure by way of the brake valve device. The brake pipe reduction continues, however, through passage 134 containing a choke plug 202, port 137 in the main slide valve 22, port 138 and cavity 128 in the auxiliary slide valve 23, port 129 and cavity 130 in the main slide valve 22 and atmospheric passage 131 but, due to the restricted flow through said choke plug the rate of reduction in brake pipe pressure is slower than the pressure in valve chamber 19 and the connected control chamber 21 reduces through port 135 in the main slide valve, passage 136 and atmospheric passage 131. As a result, the pressure in valve chamber 19 becomes lower than the brake pipe pressure in chamber 16, and the differential moves the piston 15 and auxiliary valve 23 downwardly to service lap position in which the piston stem 24 engages the main slide valve 22. Further movement is prevented by the resistance of the main slide valve 22.

In service lap position, the release valve piston chamber 47 is maintained open to the atmosphere through passage 110, cavity 130 in the main equalizing slide valve 22 and atmospheric passage 131, so that piston 46 and slide valve 50 are maintained in their upper position as in effecting a service application of the brakes. The brake cylinder passage 113 is thus maintained lapped.

When the equalizing piston 15 and auxiliary slide valve 23 move to service lap position, port 200 through the main slide valve 22 is uncovered by the auxiliary slide valve 23 and this permits fluid under pressure to flow from the equalizing valve chamber 19 through port 200 and passage 116 to diaphragm chamber 43 of the service application control valve device 10. The pressure of fluid thus supplied to chamber 43 deflects the diaphragm 42 upwardly, seating valve 37 and unseating valve 36. The seating of valve 37 closes communication from chamber 43 of the service application valve 9 to the atmosphere and the unseating of valve 36 permits fluid under pressure to flow from chamber 38 to chamber 40 and from thence through passage 41 to chamber 33, thereby equalizing the fluid pressures acting on the opposite sides of the service application valve piston 32, which permits spring 34 to shift valve piston 32 into engagement with seat rib 35. This cuts off the flow of fluid under pressure from cavity 118 to chamber 140 and from thence to the brake cylinder 3 through passage 141, passage 142 in the plug valve 143, passage 111 and pipe 88, thereby limiting the pressure in the brake cylinder to a predetermined degree proportional to the degree of brake pipe reduction.

When the equalizing valve device moves to service lap position, further quick service venting of fluid from the brake pipe through passage 134, port 137 in the main slide valve, port 138 and cavity 128 in the auxiliary slide valve 23, port 129 and cavity 130 in the main slide valve 22 and atmospheric passage 131 is cut off due to the movement of the auxiliary slide valve 23 lapping the port 137.

If a further service application of the brakes is desired, a further reduction in brake pipe pressure is effected by the brake valve device in the usual manner and this causes the equalizing piston 15 and auxiliary slide valve 23 to move from service lap position to service position, in which the mechanism again operates in the same manner as hereinbefore described to supply more fluid to brake cylinder 3 and thus effect a further application of the brakes.

In the manner just described, the brake cylinder pressure may be increased in steps in accordance with the degree of brake pipe reduction effected, and thus a graduated application of the brakes is obtained.

When the equalizing valve slide valve 23 is moved from service lap to service position to effect a further application of the brakes, communication is again established from the brake pipe passage 134 to the atmospheric passage 131 so as to effect a local quick service reduction in brake pipe pressure to hasten the increase of brake application and ensure movement of the equalizing valve device to service position. This quick service action is effective upon every successive brake pipe reduction in graduating an application of the brakes.

Diaphragm chamber 60 of the release ensuring valve device 12 being open through passages 106 and 17 to the brake pipe 4, the pressure in said chamber reduces as brake pipe pressure is reduced. When a slight reduction in pressure, of for instance less than one pound, is made in diaphragm chamber 60, supply reservoir pressure acting in chamber 62 on the opposite side of diaphragm 61 deflects said diaphragm downwardly and seats valve 59 against the opposing pressure of spring 65. Now, when the equalizing valve device moves to service position, passage 121 is connected to the atmosphere through cavity 130 in the main slide valve 22 and the atmospheric passage 131. Passage 121 connects to piston chamber 53 in the release ensuring valve device 12. Chamber 53 is open through feed groove 120 to chamber 52 which is also connected through passage 119 to chamber 63. Fluid under pressure is thus vented from the chambers 63, 52 and 53 to the atmosphere through passage 121, the feed groove 120 being of sufficient size to permit fluid under pressure to flow from chambers 63 and 52 to chamber 53 at such a rate as to prevent obtaining sufficient differential on the piston 51 to unseat the poppet valve 54.

The chamber 53 is thus vented to the atmosphere in effecting an application of the brakes, so that when the brake pipe pressure is increased to effect a release of the brakes, fluid under pressure supplied to chamber 52 will operate piston 51 to unseat valve 54 for venting fluid under pressure from the equalizing valve chamber 19 and chamber 26 at the lower side of the graduated release stop device 27 so as to ensure movement of the equalizing valve device to full release position, shown in Fig. 1, as will be hereinafter fully described.

Also, in effecting an application of the brakes, when the control chamber pressure in the equalizing valve chamber 19 is reduced a predetermined degree below the control reservoir pressure acting in chamber 26 on the opposite side of the graduated release valve piston 25, said piston is moved upwardly against the pressure of spring 28. This upward movement is limited by the engagement of said piston with gasket 145, and is adapted to thrust the stop 27 into valve chamber 19, as shown in Fig. 3, for limiting the release movement of the equalizing piston 15 and slide valves 22 and 23 in releasing after an application of the brakes as will now be described.

When it is desired to effect a release of the brakes after an application, fluid under pressure is supplied to the brake pipe 4 by the operation of the brake valve device (not shown) in the usual manner, and flows from the brake pipe through passage 17 to the equalizing piston chamber 16. When the pressure in chamber 16 is thus increased a predetermined degree above the reduced control chamber pressure in valve chamber 19, the piston 15 is moved downwardly, carrying with it the auxiliary slide valve 23 and the main slide valve 22. This downward movement ceases in graduated release position, shown in Fig. 5, in which position the piston stem 24 engages the graduated release piston stop 27 which is thrust into the chamber 19 by the pressure differential acting on piston 25 as hereinbefore described.

In the graduated release position, fluid under pressure is supplied from the equalizing valve chamber 19 through passage 116 to diaphragm chamber 43 of the service application control valve device 10. The pressure of fluid in said chamber deflects the diaphragm 42 upwardly for seating valve 37 and unseating valve 36. With valve 36 unseated, fluid under pressure is supplied from valve chamber 38 to chamber 40 and from thence through passage 41 to chamber 33 at the spring side of the service application valve piston 32, which permits the fluid pressure differential acting on said valve piston and the pressure of spring 34 to hold said valve piston in engagement with the seat rib 35 so as to prevent fluid at supply reservoir pressure from flowing from cavity 118 to passage 141 and from thence to the brake cylinder 3.

Fluid under pressure is supplied from valve chamber 19 through port 200 in the main slide valve 22 and passage 110 to piston chamber 47 of the release valve device 11, when the equalizing valve device is in the graduated release position. The pressure of fluid thus supplied to piston chamber 47 shifts the piston 46 and slide valve 50 to the release position shown in Fig. 2 of the drawings, in which position, fluid under pressure is vented from the brake cylinder 3 through pipe 88, passage 111, release choke plug 112, passage 113, cavity 114 in the release slide valve 50 and atmospheric passage 115, thereby effecting a release of the brakes.

At the same time as fluid under pressure is being vented from the brake cylinder to the atmosphere, fluid under pressure is being supplied from the supply reservoir 2 to the equalizing valve chamber 19 and control chamber 21, which is connected through passage 20 to chamber 19, by way of pipe 94, passage 95, release valve chamber 49, port 103 in the slide valve 50, passage 104 and choke plug 105, thereby charging said chambers.

The flow area of the choke plug 105 is such as to permit the equalizing valve chamber 19 and connected control chamber 21 to charge at a slower rate than the brake pipe pressure acting in the equalizing piston chamber 16 is increased, so that if the increase in brake pipe pressure is continuous, the equalizing valve piston 15 and slide valves 22 and 23 will remain in release position and the venting of fluid under pressure from the brake cylinder will be continuous.

It is the usual practice at present, however, to graduate the release of brakes, or in other words to release fluid under pressure from the brake cylinder 3 in steps. In order to thus graduate the release of brakes, the brake pipe pressure is only increased a certain amount. Now, when the pressure in the equalizing valve chamber 19 and control chamber 21 is increased in the manner hereinbefore described, to a degree slightly exceeding the increased brake pipe pressure in piston chamber 16, the equalizing piston 15 and auxiliary slide valve 23 are shifted upwardly to release lap position in which the outer end of the piston stem 24 engages the end of the main slide valve 22 which prevents further movement. In this position of the auxiliary slide valve 23, fluid under pressure is vented from the release piston chamber 47 through passage 110, port 200 in the main slide valve 22, cavity 128 in the auxiliary slide valve 23, port 129 and cavity 130 in the main slide valve 22 and atmospheric passage 131. The pressure of fluid in the release valve chamber 49 then shifts the piston 46 and slide valve 50 upwardly to the lap position in which said piston engages the gasket 139. In this position, the brake cylinder passage 113 is lapped by the slide valve 50, so as to prevent further flow of fluid from the brake cylinder to the atmosphere, and passage 104 is lapped so as to cut off the supply of fluid under pressure to the equalizing valve chamber 19 and control chamber 21.

The fluid remaining in the brake cylinder is thus bottled up until a further increase in brake pipe pressure is effected to again move the equalizing piston 15 and auxiliary slide valve 23 to the release position, shown in Fig. 5, and the apparatus will then operate as above described to effect another reduction in brake cylinder pressure, the degree of which reduction will be in proportion to the degree of increase of brake pipe pressure.

In the above manner the brake cylinder pressure may be graduated off in steps as desired. It is evident that in thus graduating the release of brakes, the pressure in valve chamber 19 may be increased to substantially that carried in the brake pipe and acting in the equalizing piston chamber 16. As hereinbefore described, it requires substantially a four pound pressure differential on the equalizing piston 15 to move said piston and the slide valve 22 and 23 to service application position on account of the predetermined loading of the slide valve 22 by the cavity 139. Said cavity is at all times open to the atmosphere and as a result, substantially the same differential is required on said piston to move the slide valves 22 and 23 from the graduated release position shown in Fig. 5 to the full release position shown in Fig. 2. It is obvious that in graduating the release of brakes if the pressure in valve chamber 19 is increased to within less than four pounds of the normal brake pipe pressure carried, it will not be possible to obtain the required differential to move the equalizing valve device from the graduated release position shown in Fig. 5 to the full release position shown in Fig. 2.

It is possible, with my invention to permit a graduated release of fluid from the brake cylinder to the point at which the pressure in the equalizing valve chamber becomes substantially equal to the normal brake pipe pressure, for the reason that I have provided means, operative when the brake pipe pressure is increased to a degree slightly less than normally carried in the brake pipe, for effecting movement of the equalizing valve device to full release position for venting fluid under pressure from the quick service reservoir 125, as will be hereinafter more fully described.

For this purpose, I provide the release ensuring valve device 12 to operate, when the brake pipe becomes substantially charged to the normal pressure, to reduce the pressure in the equalizing valve chamber 19 a sufficient degree below the brake pipe pressure in chamber 16 as to obtain the required pressure differential on piston 15 to move the slide valves 22 and 23 to their full release position shown in Fig. 2.

It will be noted that piston chamber 53 of the release ensuring valve device is open to the atmosphere through passage 121, cavity 130 in the main slide valve 22 and atmospheric passage 131 when the main slide valve 22 is in graduated release position shown in Fig. 5. Chamber 52 at the opposite side of piston 51 being connected to chamber 53 through the groove 120, both sides of said piston are subject to atmospheric pressure and spring 57 holds the poppet valve 54 seated against the seat rib 58.

The pressure of fluid in the supply reservoir 2 and in the connected diaphragm chamber 62 of the release ensuring valve device is maintained by the supply through supply pipe 5, and in releasing the brakes is therefore substantially constant. The pressure in chamber 60 at the opposite side of the diaphragm 61 increases with brake pipe pressure. The spring 65 is so adjusted that when the brake pipe pressure has been increased to within possibly less than one pound of the supply reservoir pressure in diaphragm chamber 62, said spring unseats the valve 59.

With valve 59 unseated, fluid at brake pipe pressure flows from diaphragm chamber 60 to chamber 63 and from thence through passage 119 to piston chamber 52. The rate of this supply to chamber 52 exceeds the venting capacity of groove 120 around the piston 51. Consequently, a pressure builds up in piston chamber 52 and moves said piston downwardly against the opposing pressure of spring 57. This unseats the poppet valve 54 and connects chamber 55 past the fluted valve stem 56 to chamber 53 which is open to the atmosphere through passage 121, cavity 130 in the main slide valve 22 and atmospheric passage 131.

Chamber 26 at the lower side of the graduated release valve piston 25 communicates through passage 99 with poppet valve chamber 55 which is open to the atmosphere, so that fluid under pressure is vented from chamber 26. Chamber 26 is also open to the supply reservoir 2 through passage 99, choke plug 98, passage 97, valve chambers 38 and 49, passage 95 and pipe 94, but the rate of supply to chamber 26 from the supply reservoir 2 is so restricted by the choke plug 98, that the venting of fluid under pressure from chamber 26 reduces the pressure in said chamber sufficiently that the pressure of fluid in the equalizing valve chamber 19 in addition to the pressure of spring 28 shifts the graduated release valve piston 25 and stop 27 to their normal position as shown in Fig. 2.

When the poppet valve 54 is open, fluid under pressure is also vented from the equalizing valve chamber 19 and control chamber 21 through passage 20, past the ball check valve 146, through passage 147 and chamber 55 which is open through chamber 53 to passage 121. This permits the pressure of fluid in valve chamber 19 to reduce at a rate exceeding the rate of supply from the supply reservoir 2 through the choke 105.

When the pressure in valve chamber 19 is thus reduced a predetermined amount below the brake pipe pressure in chamber 16, the piston 15 and slide valves 22 and 23 are moved to their full release position shown in Fig. 2.

It will be noted that, since the release ensuring valve device 12 is subject to the constant pressure in chamber 62 and the fixed pressure of spring 65, it will at all times operate, as above described, when the brake pipe pressure is increased to a predetermined degree, therefore, the movement of the equalizing piston 15 and slide valves 22 and 23 to the full release position, is positively ensured under all conditions. For example, if there should be sufficient leakage from the brake pipe past the piston 15 to valve chamber 19, when the brake pipe pressure is increased, to prevent the creation of a sufficient differential of pressures to move the piston 15 and slide valves 22 and 23 inwardly from application position to release position, then as soon as the brake pipe pressure has been increased substantially to the normal pressure carried in the brake system, the release ensuring valve device will operate to effect a venting of fluid from the valve chamber 19, until a sufficient differential of pressures is created on the piston 15 to ensure its movement to release position and the consequent release of the brakes.

In releasing the brakes, fluid under pressure flows from the supply reservoir 2 to the equalizing valve chamber 19 and control chamber 21 for charging said chambers. This flow tends to temporarily reduce the pressure in said reservoir and in the connected release ensuring valve diaphragm chamber 62, and cause premature operation of the release ensuring valve device. To avoid this undesirable action, choke 101 is provided and tends to maintain the pressure in diaphragm chamber 62 substantially constant even though the supply reservoir pressure may vary slightly.

In full release position of the main slide valve 22, passage 121 is lapped, which prevents further venting of fluid under pressure from the valve chamber 19 past the ball check valve 146 and the unseated poppet valve 54. The pressure then builds up in the equalizing valve chamber 19 and control chamber 21 by flow of fluid under pressure from the supply reservoir through choke 105, and finally the pressures equalize on the opposite sides of the equalizing piston 15 through the feed groove 109.

After passage 121 is lapped by the main slide valve 22, the pressure builds up in the graduated release piston chamber 26, by flow of fluid under pressure from the supply reservoir 2, through the croke 98, equal to the pressure in the equalizing valve chamber 19 which permits spring 28 to hold the piston 25 and stop 27 to the normal release position shown in Fig. 2. Fluid at the pressure supplied to chamber 26 also flows from passage 99 to poppet valve chamber 55 and from thence past said valve and the fluted valve stem 56 to piston chamber 53. Fluid at brake pipe pressure is acting in chamber 52 at the opposite side of piston 51, but upon substantial equalization of the pressures on the opposite sides of said piston, spring 57 shifts the poppet valve 54 into engagement with seat rib 58 so as to close communication from chamber 55 to chamber 53. This is necessary to avoid venting of fluid under pressure from the poppet valve chamber 55, which is in communication with the equalizing valve chamber 19 by way of ball check valve 146 and with the supply reservoir 2 through the choke plug 98, upon a succeeding application of the brakes.

In full release position of the equalizing slide valves 22 and 23, fluid under pressure is vented from the quick service chamber 125 through passage 126, port 127 in the main slide valve 22, cavity 128 in the auxiliary slide valve 23, port 129 and cavity 130 in the main slide valve 22 and the atmospheric passage 131.

As hereinbefore mentioned, the cavity 130 in the main slide valve 22 is provided for at all times exposing a predetermined area of the seating face of said slide valve to atmospheric pressure through the atmospheric passage 131. This causes said slide valve to be pressed into engagement with its seat with a predetermined force, and consequently a predetermined differential on the equalizing piston 15 of for instance four pounds, is required to move said slide valve. The piston 15 and auxiliary slide valve 23 are however intended to be sensitive to brake pipe pressure variations and to move to quick service position upon a light reduction in brake pipe pressure of for instance one pound. The degree of brake pipe reduction effected by equalization of the brake pipe and quick service chamber 125 is intended to be about two pounds, so that if a one pound reduction in brake pipe pressure is unintentionally obtained and the equalizing valve device moves to quick service position and a further two pound reduction in brake pipe pressure is obtained, the brake pipe pressure will not be sufficiently reduced to cause movement of the equalizing valve device to service position. Consequently, the equalizing valve device is sensitive to a light brake pipe reduction to effect the desired quick service action but is stable against unintentional movement to service application position.

If it is desired to effect an emergency application of the brakes, a sudden reduction in brake pipe pressure is effected in the usual manner. A corresponding reduction occurs in the equalizing piston chamber 16 and the pressure of fluid in the equalizing valve chamber 19 then shifts the equalizing piston 15 and slide valves 22 and 23 upwardly to emergency position in which said piston engages a gasket 148, as shown in Fig. 4.

In emergency position of the main equalizing slide valve 22, fluid under pressure is vented from the vent valve piston chamber 82 and emergency piston chamber 69 to the atmosphere through passages 122 and 123, cavity 149, passage 150 and cavity 130 in the main slide valve 22 and atmospheric passage 131.

The venting of fluid under pressure from the vent valve piston chamber 82 permits brake pipe pressure acting in chamber 78 at the opposite side of said piston to move said piston outwardly, thereby pulling the vent valve 77 away from the seat rib 80 against the opposing pressure of the spring 81. With the vent valve unseated, fluid under pressure is locally vented directly from the brake pipe 4 to the atmosphere through passage 17, past the vent valve 77 and through the atmospheric passage 151, so as to serially propagate quick action in the usual manner. When the brake pipe pressure is thus reduced to substantially atmospheric pressure, spring 81 urges the valve 87 back into engagement with the seat rib 80.

With the equalizing slide valve 22 in emergency position, fluid under pressure is vented from piston chamber 47 of the release valve device 11 to the atmosphere through passage 110, cavity 130 in said slide valve and the atmospheric passage 131. The piston 46 is then shifted upwardly by the pressure of fluid in valve chamber 49 and moves slide valve 50 so as to lap passage 104 and the brake cylinder passage 113 in the same manner as in effecting a service application of the brakes. Likewise, fluid under pressure is vented from diaphragm chamber 43 of the service application control valve device 10 to the atmosphere through passage 116, cavity 130 in the slide valve 22 and atmospheric passage 131. This permits spring 45 to seat valve 36 and unseat valve 37 so as to vent fluid under pressure from the application valve piston chamber 33 to the atmosphere through passage 41, chamber 40, valve chamber 39, and the atmospheric passage 115. With the application valve piston chamber 33 thus vented, supply reservoir pressure acting in cavity 118 at the opposite side of the valve piston 32 moves said valve piston away from seat rib 35, thereby permitting fluid from the supply reservoir 2 to flow through cavity 118 to chamber 140 and from thence through passage 141, restriction 144 in plug valve 143, passage 111 and pipe 88 to the brake cylinder 3 in the same manner as in effecting a service application of the brakes.

Fluid under pressure supplied to passage 141 flows to chamber 154 and acts on the area of the emergency valve piston 72 within the seat rib 73. With the emergency piston chamber 69 open to the atmosphere, the pressure of fluid in chamber 154 moves the valve piston 72 away from the seat rib 73 and shifts the piston 68 into engagement with the gasket 152. In this position of the valve piston 72, fluid under pressure flows from chamber 154 directly to passage 111 and from thence through pipe 88 to the brake cylinder 3. The supply of fluid through the emergency valve is independent of the plug valve 143 and permits fluid under pressure to flow to the brake cylinder at a faster rate than is obtained in a service application of the brakes through the plug valve 143 by itself.

The service application valve piston 32 remains in its lower position away from the seat rib 35 as long as the equalizing valve device remains in emergency position and maintains the valve piston chamber 33 vented through the operation of the service application control valve device 10. As a result, the pressures in the brake cylinder 3 and supply reservoir 2 equalize and since the supply reservoir 2 is charged through the supply pipe 5, which is connected to any suitable source of fluid under pressure, the brake cylinder pressure will build up in an emergency application of the brakes to the pressure of fluid in the supply pipe and will then be maintained against leakage in accordance with the rate of supply of fluid under pressure to the supply pipe 5.

One particular advantage of my improved brake equipment is that the high emergency brake cylinder pressure can be obtained at any time, for the reason that in emergency, the brake cylinder 2 is placed in direct communication with the source of supply of fluid under pressure through the supply pipe.

In emergency position of the equalizing valve device, fluid under pressure is vented from valve chamber 19 and the connected control chamber 21 through port 135 in the main slide valve 22, passage 136 and atmospheric passage 131. When the pressure in said chamber is thus reduced to below the value of the spring 31, said spring shifts the piston 15 and the auxiliary slide valve 23 to emergency lap position in which the piston stem engages the upper end of the main slide valve. Another important feature is that the pressure in the valve chamber 19 is reduced, as just described, to a low degree, as for instance nearly to atmospheric pressure if desired, for the reason that there is no fluid pressure acting to unseat the main slide valve 22 in emergency position and by reducing the pressure in the valve chamber to a low degree, the movement of the equalizing valve device to graduated release position shown in Fig. 5 is facilitated by a relatively low brake pipe pressure in releasing the brakes after an emergency application, as will now be described.

To release the brakes after an emergency application, fluid under pressure is supplied to the brake pipe 4 and to the piston chamber 16 of the equalizing valve device 8. When the brake pipe pressure acting on the upper face of the equalizing piston 15 is thus increased a predetermined degree over the reduced pressure in the equalizing valve chamber 19, the piston 15 and slide valves 22 and 23 are shifted to graduated release position, as shown in Fig. 5, in which position, the piston stem 24 engages the graduated release piston stop 27.

In graduated release position of the main slide valve 22, fluid under pressure is supplied through passage 116 to diaphragm chamber 43 of the service application control valve device 10 and deflects the diaphragm 42 upwardly, seating valve 37 and unseating valve 36 which permits fluid under pressure from the supply reservoir 2 to flow from chamber 38 to chamber 40 and from thence through passage 41 to the spring side of the service application valve piston 32. The pressure of fluid thus supplied to chamber 33, plus the pressure of spring 34 seats the service application valve piston against seat rib 35 so as to prevent further flow of fluid under pressure to the brake cylinder 3.

At the same time as the supply of fluid to the brake cylinder 3 is cut off, fluid under pressure is supplied from the equalizing valve chamber 19 through port 200 in the main slide valve 22 and passage 110 to the release valve piston chamber 47. The pressure of fluid thus supplied to chamber 47 plus the pressure of spring 48 shifts the piston 46 and slide valve 50 to release position, in which fluid under pressure is vented from the brake cylinder 3 through pipe 88, passage 111, choke 112, passage 113, cavity 114 and atmospheric passage 115. At the same time, supply reservoir pressure is supplied from valve chamber 49 through port 103 in slide valve 50, passage 104 and choke plug 105 to the equalizing valve chamber 19 and control reservoir 21, thereby charging said chamber and reservoir.

The release of brakes may be graduated if desired. When the brake pipe pressure is increased to substantially the degree normally carried, the release ensuring valve device 12 operates in the same manner as hereinbefore described to cause the equalizing valve device 8 to move to the full release position, in which a complete release of the brakes takes place.

With the equalizing slide valve 22 in the graduated release position and full release position, passage 123 is lapped. Passage 123 connects through passage 122 to the vent valve piston chamber 82 and the emergency valve piston chamber 69. As the brake pipe pressure is increased, fluid from the brake pipe flows through passage 17 to vent valve chamber 78 and from thence through ports 94, port 121 in the vent valve piston 90 to chamber 82, and from chamber 82 through passage 122 to the emergency piston chamber 69. The increase in pressure in chamber 69 acting on the emergency piston 68 shifts said piston and the valve piston 72 to the left until said valve piston engages the seat rib 73 so as to close communication from chamber 154 to the brake cylinder passage 111. After the valve piston 72 thus engages seat rib 73, further relative movement of the piston 68 occurs until said piston engages the seat rib 124.

With the emergency valve piston 72 thus engaging the seat rib 73, the emergency by-pass around the plug valve 143 is closed.

The application control plug valve 143 is adapted to be turned by a handle 155 to a plurality of different positions, such as from the position shown in Fig. 2 of the drawings to the position shown in Fig. 6 of the drawings, and said plug valve is provided with a plurality of through ports containing restrictions of different sizes. In Fig. 2, fluid under pressure is supplied to the brake cylinder through the port 142 containing the restriction 144, but if the plug valve is turned to the position shown in Fig. 6, fluid under pressure is supplied to the brake cylinder through port 156 containing a restriction 157 which is different in size from the restriction 144 in port 142. This is desirable in that the plug valve may be turned to a position corresponding to the load carried by a car, so that when the car is loaded the brake cylinder pressure may build up faster than when the car is not loaded. By thus permitting a more rapid build up of brake cylinder pressure on the loaded car, the braking power developed on said car may increase nearly in synchronism with that on an empty car in which the rate of increase in brake cylinder pressure is at a slower rate as controlled by the plug valve 143 in a different position. By thus varying the rate of build up of pressure in the brake cylinder on empty and loaded cars in a train so as to obtain a nearly synchronous braking power on all cars, the decelerating of a train is obtained more smoothly and in a minimum of time.

Another desirable application of the plug valve 143 is that it may be adjusted to permit the same rate of build up in brake cylinders of various volumes. It is well known that the brake cylinder volume required for a car, either in a single brake cylinder or a multiplicity of brake cylinders, depends primarily upon the weight of a car. Thus for various weights of cars the brake cylinder volume will be different, but by the use of the plug valve 143, the rate of brake application on the cars in a train can readily be sustantially synchronized by turning the plug valve 143 to the proper position.

The adjustability of the rate of flow of fluid to the brake cylinder in effecting an application of the brakes is very important as pointed out above and my improved valve mechanism is especially adapted to this purpose for the reason that the equalizing valve device 8 is merely a pilot for the service application valve device 9 and release valve device 11, and the operation of the equalizing valve device in effecting an application of the brakes is controlled by the time required to effect a reduction in pressure in the valve chamber 19 and control chamber 21, which are of fixed volume under all conditions. This time operation of the equalizing valve device is fixed, but the brake cylinder pressure obtained is not only governed by this fixed time but in addition by the rate at which fluid is permitted to flow to the brake cylinder as governed by the controlling restriction in the plug valve 143. Hence, although the time which fluid may flow to the brake cylinder is fixed, the brake cylinder pressure obtained in this fixed time may be varied as desired.

The rate of release of the brakes after an application is not critical like the rate of application, but may be adjusted according to the brake cylinder volume by inserting the proper size of choke plug 112.

If for any reason it is desired to render the brake controlling valve mechanism inoperative, the cut-out valve device 6 is turned from the cut-in position shown in Fig. 2 of the drawings to the cut-out position shown in Fig. 7 of the drawings. In the cut-out position communication from the brake pipe 4 and supply pipe 5 to the brake controlling valve device and supply reservoir 2 respectively, is interrupted, and the brake cylinder pipe 88 is opened to the atmosphere through port 87 in the plug valve 83 and the atmospheric passage 89. Thus if the brakes are applied at the time the brake controlling valve mechanism is cut out, they will be immediately released and not interfere with the train operation, or if the brake equipment is charged with fluid under pressure at the time it is cut out and due to the subsequent operation of the brake controlling valve device, on account of leakage, to supply fluid to the brake cylinder, the brakes will not apply due to the brake cylinder being opened to the atmosphere.

The check valve 7 is provided in the fluid pressure supply pipe to the supply reservoir 2 so that in case of leakage of fluid under pressure from the supply pipe 2 or in case of a train break-in-two, the supply of fluid in reservoir 2 for applying the brakes will not be lost.

It will be noted that substantially all of the fluid under pressure employed for applying and releasing the brakes on the car comes from the fluid pressure supply pipe 5. A certain small amount may come from the brake pipe 4 for the purpose of obtaining equalization of pressures on the opposite sides of the equalizing valve piston 15 in releasing after an application of the brakes, but the primary purpose of the brake pipe is merely as a medium through which the brakes are controlled. As a result of thus providing a supply of fluid under pressure on the car independent of the brake pipe, the brakes may be operated as rapidly as the brake pipe pressure may be varied.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe and a quick service reservoir, of a valve device operated upon a reduction in brake pipe pressure to vent fluid under pressure from said brake pipe to said reservoir for effecting a quick service reduction in brake pipe pressure, and operative upon a further reduction in brake pipe pressure to effect an application of the brakes and to connect said brake pipe directly to the atmosphere for effecting a further quick service reduction in brake pipe pressure.

2. In a fluid pressure brake, the combination with a brake pipe and a quick service reservoir, of a valve device subject to the opposing pressures of the brake pipe and a chamber and movable upon a reduction in brake pipe pressure to quick service position for venting fluid under pressure from said brake pipe to said quick service reservoir, and movable upon a further reduction in brake pipe pressure to application position for venting fluid under pressure from said brake pipe directly to the atmosphere and for venting fluid under pressure from said chamber for moving said valve device to lap position, in which position, the venting of fluid under pressure from said chamber and from said brake pipe is cut off.

3. In a fluid pressure brake, the combination with a brake pipe and a quick service reservoir, of a main slide valve, an auxiliary slide valve movable relative to said main slide valve, and a piston subject to the opposing pressures of the brake pipe and a chamber for moving said slide valves, said piston being operated by a light reduction in brake pipe pressure to move said auxiliary slide valve relative to said main slide valve for connecting said quick service reservoir to said brake pipe and operated by a further reduction in brake pipe pressure to move said main slide valve for connecting said brake pipe to the atmosphere and for venting fluid under pressure from said chamber for moving said piston and auxiliary slide valve in the reverse direction relative to said main slide valve for cutting off the venting of fluid under pressure from said chamber and from said brake pipe.

4. In a fluid pressure brake, the combination with a brake cylinder and a brake pipe, of an equalizing valve device movable upon a reduction in brake pipe pressure to service position for effecting the supply of fluid under pressure to said brake cylinder and for venting fluid under pressure from said brake pipe directly to the atmosphere, and operative upon an increase in brake pipe pressure to effect a release of fluid under pressure from said brake cylinder to the atmosphere and to close the atmospheric connection to said brake pipe.

5. In a fluid pressure brake, the combination with a brake pipe and a brake cylinder, of valve means for controlling the supply and release of fluid under pressure to and from said brake cylinder and for controlling the supply of fluid under pressure to a chamber, and an equalizing valve device operative by the pressure of fluid in said chamber upon a reduction in brake pipe pressure to cause said valve means to operate to supply fluid under pressure to said brake cylinder and to cut off the supply of fluid under pressure to said chamber and operative upon an increase in brake pipe pressure to cause said valve means to operate to vent fluid under pressure from said brake cylinder and to supply fluid under pressure to said chamber.

6. In a fluid pressure brake, the combination with a brake pipe and a brake cylinder, of valve means for controlling the supply and release of fluid under pressure to and from said brake cylinder and for controlling the supply of fluid under pressure to a chamber, and an equalizing valve device operative by the pressure of fluid in said chamber upon a reduction in brake pipe pressure to vent fluid under pressure from said valve means for causing said valve means to be operated for supplying fluid under pressure to said brake cylinder and for cutting off the supply of fluid under pressure to said chamber, said equalizing valve device being operative upon an increase in brake pipe pressure to supply fluid under pressure to said valve means for operating said valve means to vent fluid under pressure from said brake cylinder and to supply fluid under pressure to said chamber.

7. In a fluid pressure brake, the combination with a brake pipe, a brake cylinder and a chamber, of valve means for connecting said brake cylinder with the atmosphere and for supplying fluid under pressure to said chamber, and an equalizing valve device subject to the opposing pressures of the brake pipe and said chamber and operative upon a reduction in brake pipe pressure to vent fluid under pressure from said chamber and to cause said valve means to operate to close the atmospheric connection to said brake cylinder and to cut off the supply of fluid under pressure to said chamber, said equalizing valve device being operative upon an increase in brake pipe pressure to cause said valve means to supply fluid under pressure to said chamber and to connect said brake cylinder to the atmosphere.

8. In a fluid pressure brake, the combination with a brake pipe, a brake cylinder, and a chamber, of valve means having a release position for venting fluid under pressure from said brake cylinder and for supplying fluid under pressure to said chamber, a lap position for holding the brake cylinder pressure and for cutting off the supply of fluid under pressure to said chamber, and an equalizing valve device subject to the opposing pressures of the brake pipe and said chamber and operative upon an increase in brake pipe pressure to cause said valve means to move to release position, said equalizing valve device being operative upon an increase in the pressure in said chamber over the brake pipe pressure to cause said valve means to move to lap position.

9. In a fluid pressure brake, the combination with a brake pipe, a brake cylinder, a source of fluid under pressure and a chamber, of a release valve device having a release position for venting fluid under pressure from said brake cylinder and for supplying fluid under pressure from said source to said chamber and a lap position for holding fluid under pressure in said brake cylinder and for cutting off the supply of fluid under pressure to said chamber, and an equalizing valve device subject to the opposing pressures of the brake pipe and said chamber and operative upon an increase in brake pipe pressure over the pressure in said chamber to cause said release valve device to move to release position, said equalizing valve device being operative upon an increase in pressure in said chamber over the pressure in said brake pipe to cause said release valve device to move to lap position.

10. In a fluid pressure brake, the combination with a brake pipe, a brake cylinder, a source of fluid under pressure and a chamber, of a release valve device having a release position for venting fluid under pressure from said brake cylinder and for supplying fluid under pressure from said source to said chamber and a lap position for holding fluid under pressure in said brake cylinder and for cutting off the supply of fluid under pressure to said chamber, an equalizing valve device subject to the opposing pressures of the brake pipe and said chamber and operative upon an increase in brake pipe pressure over the pressure in said chamber to cause said release valve device to move to release position, said equalizing valve device being operative upon an increase in pressure in said chamber over the pressure in said brake pipe to cause said release valve device to move to lap position, and means for also supplying fluid under pressure from said brake pipe to said chamber when said equalizing valve device is operated by an increase in brake pipe pressure.

11. In a fluid pressure brake, the combination with a brake pipe and a brake cylinder, of a release valve device operated by fluid pressure upon a reduction in brake pipe pressure to close an atmospheric connection to said brake cylinder, resilient means, application valve means operated by said resilient means for controlling the supply of fluid under pressure to said brake cylinder upon a reduction in brake pipe pressure, said application valve means and release valve device being operated by fluid under pressure to cut off the supply of fluid under pressure to said brake cylinder and to vent fluid under pressure from said brake cylinder to the atmosphere upon an increase in brake pipe pressure, and an equalizing valve device operative in accordance with variations in brake pipe pressure to control the operation of said application valve means and said release valve device.

12. In a fluid pressure brake, the combination with a brake pipe and a chamber, of a valve device operative in accordance with variations in fluid pressure for controlling the release of the brakes and for controlling the supply of fluid under pressure to said chamber, a main valve for controlling the pressure on said valve device at one time, an auxiliary valve for controlling the pressure on said valve device at another time, a piston controlled by variations in the opposing pressures of the brake pipe and said chamber for operating said valves, and means operated upon a reduction in pressure in said chamber for defining the position in which the pressure of fluid on said valve device is controlled by said auxiliary valve.

13. In a fluid pressure brake, the combination with a brake pipe and a source of fluid under pressure, of an equalizing valve device subject to variations in brake pipe pressure and having a full release position and a graduated release position for releasing the brakes, a stop device operated by the pressure of fluid in said source upon a reduction in brake pipe pressure for defining the graduated release position, and valve means operated upon an increase in brake pipe pressure for rendering said stop device ineffective.

14. In a fluid pressure brake, the combination with a brake pipe and a source of fluid under pressure, of an equalizing valve device subject to variations in brake pipe pressure and having a full release position and a graduated release position for releasing the brakes, a stop device operated by the pressure of fluid in said source upon a reduction in brake pipe pressure for defining the graduated release position, and valve means operated when a predetermined ratio is obtained between the pressures in said brake pipe and said source upon an increase in brake pipe pressure for reducing the operating pressure on said stop device and on said equalizing valve device for moving said equalizing valve device to full release position.

15. In a fluid pressure brake, the combination with a brake pipe, a source of fluid at all times maintained at a constant pressure, and a chamber supplied with fluid from said source, of an equalizing valve device subject on one side to the pressure in said chamber and movable to a release position, upon a reduction in pressure in said chamber, for releasing the brakes, a spring, and valve means operative to effect a reduction in pressure in said chamber and subject to the pressure of the source on one side and brake pipe pressure plus the pressure of said spring on the opposite side.

16. In a fluid pressure brake, the combination with a brake pipe and a chamber, of an equalizing valve device movable to a graduated release position upon an increase in brake pipe pressure for releasing the brakes and movable to a full release position upon a reduction in pressure in said chamber for releasing the brakes, of a stop device operated upon a reduction in brake pipe pressure for temporarily preventing movement of said equalizing valve device from graduated release position to full release position, and means operative by brake pipe pressure for rendering said stop device ineffective and for reducing the pressure in said chamber.

17. In a fluid pressure brake, the combination with a brake pipe, a source of fluid under pressure, and a chamber supplied with fluid under pressure from said source, a choke for controlling said supply, an equalizing valve device movable to graduated release position upon an increase in brake pipe pressure over the pressure in said chamber for releasing the brakes and movable to full release position upon a reduction in pressure in said chamber below brake pipe pressure for releasing the brakes, a stop device having communication with said source of fluid under pressure and operated by fluid under pressure from said source upon a reduction in pressure in said chamber for defining the graduated release position of said equalizing valve device, a choke in said communication, and valve means operated when the brake pipe pressure is increased to within a predetermined degree of the pressure in said source to vent fluid from said stop device for rendering same ineffective and to vent fluid from said chamber.

18. In a fluid pressure brake, the combination with a brake pipe, a brake cylinder, and a choke, of valve means operative upon a reduction in brake pipe pressure to supply fluid under pressure through said choke to said brake cylinder, and a valve device operative upon a reduction in brake pipe pressure, by the pressure of fluid supplied through said choke to said brake cylinder, to open a by-pass around said choke for increasing the rate of supply of fluid under pressure to said brake cylinder.

19. In a fluid pressure brake, the combination with a brake pipe and a brake cylinder, of valve means operated upon a reduction in brake pipe pressure to supply fluid under pressure to said brake cylinder, a choke for restricting said supply in effecting a service application of the brakes, and a valve device operated upon an emergency reduction in brake pipe pressure to open a communication from said valve means to said brake cylinder around said choke.

20. In a fluid pressure brake, the combination with a brake pipe and a brake cylinder, of valve means operated upon a reduction in brake pipe pressure to supply fluid under pressure to said brake cylinder, a choke for restricting said supply in effecting a service application of the brakes, and a valve device controlled by said valve means, and operative upon an emergency reduction in brake pipe pressure to open a by-pass around said choke for increasing the rate of supply of fluid under pressure from said valve means to said brake cylinder.

21. In a fluid pressure brake, the combination with a brake pipe and a brake cylinder, of valve means operated upon a reduction in brake pipe pressure to supply fluid under pressure to said brake cylinder, a choke for restricting said supply in effecting a service application of the brakes, and a valve device controlled by said valve means and operative by the pressure of fluid on the opposite sides of said choke upon an emergency reduction in brake pipe pressure to open a by-pass around said choke for increasing the rate of supply of fluid under pressure from said valve means to said brake cylinder.

22. In a fluid pressure brake, the combination with a brake pipe and a brake cylinder, of a choke for controlling the supply of fluid under pressure to said brake cylinder in effecting a service application of the brakes, an emergency valve subject to the pressures on the opposite sides of said choke and operative to open a by-pass around said choke for increasing the rate of supply of fluid under pressure to said brake cylinder in effecting an emergency application of the brakes, an emergency piston operated by fluid under pressure to close said emergency valve, and valve means operated upon a reduction in brake pipe pressure to supply fluid under pressure to a communication leading to said choke and operative when the brake pipe pressure is vented at an emergency rate to vent fluid under pressure from said emergency piston.

23. In a fluid pressure brake, the combination with a brake pipe and a brake cylinder, of a choke for controlling the supply of fluid under pressure to said brake cylinder in effecting a service application of the brakes, an emergency valve device normally subject to brake pipe pressure and operated upon a reduction in brake pipe pressure to open a by-pass around said choke for increasing the rate of supply of fluid under pressure to said brake cylinder, a vent valve device normally subject to brake pipe pressure and operated upon a reduction in brake pipe pressure to vent fluid under pressure from said brake pipe to the atmosphere, and valve means operated upon a reduction in brake pipe pressure to supply fluid under pressure to said choke and to said by-pass and operated when the brake pipe pressure is reduced at an emergency rate to vent fluid under pressure from said emergency valve device and from said vent valve device.

24. In a fluid pressure brake, the combination with a brake pipe and a chamber charged with fluid under pressure, of an equalizing valve device subject to the opposing pressures of the brake pipe and said chamber and movable to a release position for effecting a release of the brakes, and valve means operable separately from the equalizing valve device upon an increase in brake pipe pressure for venting fluid under pressure from said chamber for effecting movement of said equalizing valve device to release position, said equalizing valve device controlling communication through which fluid is vented from said chamber.

25. In a fluid pressure brake, the combination with a brake pipe and a chamber charged with fluid under pressure, of an equalizing valve device subject to the opposing pressures of the brake pipe and said chamber and movable to a release position for effecting a release of the brakes, and valve means operable separately from the equalizing valve device upon an increase in brake pipe pressure for venting fluid under pressure from said chamber for effecting movement of said equalizing valve device to release position, said equalizing valve device controlling communication through which fluid is vented from said chamber and operative upon movement to release position to close said communication.

26. In a fluid pressure brake, the combination with a brake pipe and a chamber charged with fluid under pressure, of an equalizing valve device subject to the opposing pressures of the brake pipe and said chamber and movable to a release position for effecting a release of the brakes, a valve for venting fluid under pressure from said chamber for effecting movement of said equalizing valve device to release position, and a movable abutment operable separately from the equalizing valve device upon an increase in brake pipe pressure for effecting the operation of said valve, said equalizing valve device controlling communication through which fluid is vented from said chamber.

27. In a fluid pressure brake, the combination with a brake pipe and a chamber charged with fluid under pressure, of an equalizing valve device subject to the opposing pressures of the brake pipe and said chamber and movable to a release position for effecting a release of the brakes, a valve for venting fluid under pressure from said chamber for effecting movement of said equalizing valve device to release position, and a movable abutment subject on one side to a constant pressure and operated upon an increase in brake pipe pressure on the other side for effecting the operation of said valve, said equalizing valve device controlling communication through which fluid is vented from said chamber by the operation of said valve.

28. In a fluid pressure brake, the combination with a brake pipe and a chamber charged with fluid under pressure, of an equalizing valve device having an application position and a release position, a valve for venting fluid under pressure from said chamber for effecting movement of said equalizing valve device to release position, and a movable abutment for operating said valve, said abutment having a chamber at one side adapted to be vented when the equalizing valve device is in application position and having a chamber at the opposite side, and means operated upon an increase in brake pipe pressure for connecting said chamber at the opposite side to the brake pipe.

29. In a fluid pressure brake, the combination with a brake pipe and a chamber charged with fluid under pressure, of an equalizing valve device having an application position and a release position, a valve for venting fluid under pressure from said chamber for effecting movement of said equalizing valve device to release position, and a movable abutment for operating said valve, and valve means operated upon an increase in brake pipe pressure to supply fluid under pressure for operating said valve, said equalizing valve device being adapted in release position to close the communication through which fluid is vented from said chamber by operation of said valve.

30. In a fluid pressure brake, the combination with a brake pipe and a source of fluid maintained at normal brake pipe pressure, of an equalizing valve device subject to the opposing pressures of the brake pipe and a chamber and operated upon a reduction in brake pipe pressure to effect an application of the brakes and movable upon a subsequent reduction in pressure in said chamber to a position in which the release of the brakes is effected, and valve means subject to the opposing pressures of said source and the brake pipe and operated upon an increase in brake pipe pressure for reducing the pressure in said chamber.

31. In a fluid pressure brake, the combination with a brake pipe, of an equalizing valve device subject to the opposing pressures of the brake pipe and a chamber and operated upon a reduction in brake pipe pressure to effect an application of the brakes and movable upon a subsequent reduction in pressure in said chamber to a position in which the release of the brakes is effected, a chamber charged with fluid at a pressure which remains substantially constant, and valve means subject to the opposing pressures of the last mentioned chamber and said brake pipe and operative upon an increase in brake pipe pressure to effect a reduction in the pressure in the first mentioned chamber.

32. In a fluid pressure brake, the combination with a brake pipe, of an equalizing valve device subject to the opposing pressures of the brake pipe and a chamber and operated upon a reduction in brake pipe pressure to effect an application of the brakes and movable upon a subsequent reduction in pressure in said chamber to a position in which the release of the brakes is effected, a chamber at all times charged with fluid at the pressure normally carried in said brake pipe, valve means subject to the opposing pressures of the brake pipe and the last mentioned chamber and operative to effect a reduction in the pressure in the first mentioned chamber, and pressure exerting means acting on said valve means and operative when a predetermined relation is obtained between the pressures in the last mentioned chamber and the brake pipe, upon an increase in brake pipe pressure, for effecting the operation of said valve means.

33. In a fluid pressure brake, the combination with a brake pipe, of an equalizing valve device subject to the opposing pressures of the brake pipe and a chamber and operated upon a reduction in brake pipe pressure to effect an application of the brakes and movable upon a subsequent reduction in pressure in said chamber to a position in which the release of the brakes is effected, a chamber charged with fluid at a pressure which is independent of the pressure of fluid in the first mentioned chamber, valve means subject to the opposing pressures of the second mentioned chamber and the brake pipe and operative upon an increase in brake pipe pressure to reduce the pressure in the first mentioned chamber, and means for controlling the time of operation of said valve means with respect to the pressures in the second mentioned chamber and in said brake pipe.

34. In a fluid pressure brake, the combination with a brake pipe, of an equalizing valve device subject to the opposing pressures of the brake pipe and a chamber and operated upon a reduction in brake pipe pressure to effect an application of the brakes and movable upon a subsequent reduction in pressure in said chamber to a position in which the release of the brakes is effected, a chamber charged with fluid at a pressure which is independent of the pressure of fluid in the first mentioned chamber, valve means subject to the opposing pressures of the second mentioned chamber and the brake pipe and operative upon obtaining a predetermined differential between the last mentioned opposing pressures to reduce the pressure in the first mentioned chamber, and means for defining said differential of pressures.

35. In a fluid pressure brake, the combination with a brake pipe, of an equalizing valve device subject to the opposing pressures of the brake pipe and a chamber and operated upon a reduction in brake pipe pressure to effect an application of the brakes and movable upon a subsequent reduction in pressure in said chamber to a position in which the release of the brakes is effected, a chamber charged with fluid at a pressure which is independent of the pressure of fluid in the first mentioned chamber, valve means subject to the opposing pressures of the second mentioned chamber and the brake pipe and operative upon obtaining a predetermined differential between the last mentioned opposing pressures to reduce the pressure in the first mentioned chamber, and a spring acting on said valve means for fixing said differential of pressure.

36. In a fluid pressure brake, the combination with a brake pipe, of an equalizing valve device subject to the opposing pressures of the brake pipe and a chamber and operated upon a reduction in brake pipe pressure to effect an application of the brakes and movable upon a subsequent reduction in pressure in said chamber to a position in which the release of the brakes is effected, a chamber charged with fluid at a pressure which is independent of the pressure of fluid in the first mentioned chamber, valve means subject to the opposing pressures of the second mentioned chamber and the brake pipe and operative upon obtaining a predetermined differential between the last mentioned opposing pressures to reduce the pressure in the first mentioned chamber, and a spring acting on said valve means for determining said differential of pressures, and means for adjusting the pressure of said spring.

37. In a fluid pressure brake, the combination with a brake pipe, a source of fluid maintained at a pressure equal to the normal brake pipe pressure and a chamber supplied with fluid from said source, of an equalizing valve device subject in one direction to the pressure in said chamber and movable to release position upon a reduction in pressure in said chamber for releasing the brakes, and valve means subject to the opposing pressures of the brake pipe and said source and operated upon an increase in brake pipe pressure for reducing the pressure in said chamber.

38. The combination with a brake pipe and a valve device controlled by the opposing pressures of the brake pipe and a chamber and operative upon a preponderance of brake pipe pressure over the pressure in said chamber to effect a release of brakes, and valve means controlled by brake pipe pressure acting in opposition to a pressure substantially equal to that normally carried in said chamber and operated only when the brake pipe pressure is increased to substantially the degree normally carried for effecting a reduction in pressure in said chamber and thereby effect said operation of said valve device.

JOSEPH C. McCUNE.